Dec. 24, 1963    P. L. RUBEN ETAL    3,115,538
MICROSCOPE OBJECTIVE
Filed March 22, 1962
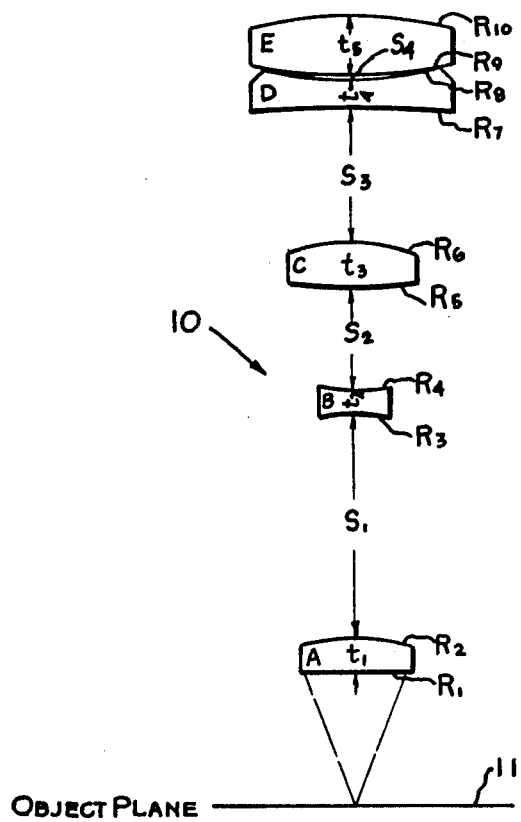
MAGNIFICATION = 5X
N.A. = .10
INVENTORS
PAUL L. RUBEN AND
GEORGE F. ZIEGLER
BY
Frank C. Parker
ATTORNEY

United States Patent Office 3,115,538
Patented Dec. 24, 1963

3,115,538
MICROSCOPE OBJECTIVE
Paul L. Ruben, Rochester, and George F. Ziegler, Gates, N.Y., assignors to Bausch & Lomb Incorporated, Rochester, N.Y., a corporation of New York
Filed Mar. 22, 1962, Ser. No. 183,006
3 Claims. (Cl. 88—57)

This invention relates to an optical objective for microscopes and more particularly it relates to improvements in low power objectives for metallographic microscopes.

This is a continuation-in-part of our copending application Serial Number 17,876, filed March 28, 1960, now abandoned.

It is an object of this invention to provide a microscope objective of low power which is particularly adapted to metallographic microscopes and the like by reason of having an excellent flat field and superior correction for both chromatic and monochromatic image aberrations.

It is a further object to provide such a device which is simple in structure and economical to build while being capable of superior performance.

Further objects and advantages will be apparent from a study of the specification herebelow taken together with the accompanying drawing, wherein the single FIGURE of the drawing shows a preferred form of microscope objective, generally designated by the numeral 10, comprising four lens members A, B, C and DE, all of which are single lenses except the rearmost member DE which is compound and in the form of a doublet, all members being in optical alignment with each other. The objective 10 so constituted is located in imaging relation to an object plane 11 whereat the specimen to be examined is placed so that a flat image is projected therefrom of substantially 5× magnification, the corresponding numerical aperture being substantially 0.10.

The front or first lens member A which is located nearest the object plane 11 is preferably although not necessarily in the form of a plano-convex lens having its plano surface facing the object plane 11. Spaced rearwardly from the lens A is a double concave lens B and rearwardly therefrom is spaced a double convex lens C. Most rearwardly is located the aforesaid compound lens DE which in this form of the invention is composed of a front double concave lens element D which is located contiguously to a rear double convex lens E.

All of the aforesaid lens members have positive power except the second lens B which has negative power. For the attainment of the objects of this invention, the best distribution of powers between the respective lens members is as follows: the negative power of the negative lens B is numerically equal to between 2.5 and 2.7 times the positive power of the first lens member A, and the positive power of the third lens member C lies between 1.05 and 1.10 times the power of the first lens member A. The positive power of the rearmost double convex lens element E lies between 80% and 90% of the power of the first lens A. This distribution of powers in objective 10 yields a slight positive Petzval sum in the order of +.00155/mm. which is advantageous over the usual negative Petzval sum found in comparable microscope objectives in the prior art. As evidenced by the Petzval sum, a very flat field is produced and the fact that the Petzval sum is slightly positive is helpful in correcting or compensating residual negative image aberrations found in other parts of the optical system of the microscope, such as the eyepiece.

In conformity with this distribution of lens power, the corresponding focal lengths of the individual lens members are as given herebelow. The negative focal length of lens B should be numerically between $.34F_A$ to $.41F_A$ wherein $F_A$ designates the focal length of the lens member A per se. The double convex lens member C has a positive focal length which lies between $.83F_A$ and $1.0F_A$ and the focal length of the negative element D of the rearmost lens member DE is numerically between $1.3\times$ and $1.6\times$ the focal length of the positive lens element E. When stated in terms of the equivalent focus F of the objective 10, the individual focal lengths $F_A$ to $F_E$ of the lens elements, which are designated A to E in the drawing, are specified by the limiting statements given herebelow which correspond substantially to the values given in the preceding paragraph.

$$.31F < F_A < .37F$$
$$.12F < -F_B < .14F$$
$$.29F < F_C < .35F$$
$$.53F < -F_D < .65F$$
$$.37F < F_E < .44F$$

For the improvement of correction for lateral and longitudinal chromatism in the image produced by the objective 10, the front lens member A is made of extra dense flint glass instead of the usual crown glass as found in most of the prior art, the refractive index being over 1.700 and the Abbe number being less than 35.0. For further improvement of chromatic conditions in the image, the rear lens member DE is split into negative and positive elements having the difference in the refractive index of the glasses from which they are made no greater than .004 and having Abbe numbers which differ by at least 20.0, the greater Abbe number being related to the positive element E.

An advantageous relationship of the refractive curvatures of the various lens members for an objective having a numerical aperture of 0.10 and a magnification of 5× has been determined as given in the following statement of inequalities wherein $R_1$ to $R_6$ resignate the radius of the refractive curvatures of the lenses A to C, respectively, and F is the equivalent focus of the microscope objective as aforesaid.

$$R_1 > \pm 10.0F$$
$$.22F < R_2 < .28F$$
$$.74R_4 < R_3 < .90R_4$$
$$.19R_5 < R_6 < .24R_5$$

Computation and experiment have also established that the constructional data for the best forms of the microscope objective 10 should lie within the values stated in the following statement of inequalities which relates to all of the lens surface radii $R_1$ to $R_{10}$, naming said radii in order from the front or object side of the objective, as well as the thicknesses $t_1$ to $t_5$, the lens spacings $S_1$ to $S_4$, and F designates the equivalent focus of the objective 10.

$$R_1 > \pm 10.0F$$
$$.227F < -R_2 < .275F$$
$$.160F < -R_3 < .192F$$
$$.195F < R_4 < .237F$$
$$.895F < R_5 < 1.08F$$
$$.190F < -R_6 < .228F$$
$$4.0F < -R_7 < 4.9F$$
$$.367F < R_8 < .446F$$
$$.46F < R^9 < .55F$$
$$.435F < -R_{10} < .53F$$
$$.033F < t_1 < .037F$$
$$.021F < t_2 < .026F$$
$$.047F < t_3 < .058F$$
$$.026F < t_4 < .036F$$
$$.070F < t_5 < .083F$$
$$.26F < S_1 < .31F$$
$$.10F < S_2 < .12F$$
$$.14F < S_3 < .17F$$
$$S_4 = 0. \text{ to } .0042F$$

the refractive index $n_D$ of the glasses from which said elements are formed being specified by the mathematical statements given herebelow, For the first element (lens member A in the drawing), $$1.710 < n_D(A) < 1.730$$

For the second element (lens member B in the drawing), $$1.710 < n_D(B) < 1.730$$

For the third element (lens member C in the drawing), $$1.531 < n_D(C) < 1.551$$

For the fourth element (designated D in the drawing), $$1.611 < n_D(D) < 1.631$$

For the fifth element (designated E in the drawing), $$1.610 < n_D(E) < 1.620$$

the Abbe number $\nu$ of said glasses being specified by the mathematical statements given herebelow, For the first element A, $28.0 < \nu(A) < 31.0$
For the second element B, $28.0 < \nu(B) < 31.0$
For the third element C, $58.0 < \nu(C) < 63.0$
For the fourth element D, $34.0 < \nu(D) < 38.0$
For the fifth element E, $58.0 < \nu(E) < 63.0$ The constructional data for one successful form of the present invention are given in the table herebelow wherein the designations $R_1$ to $R_{10}$, $t_1$ to $t_5$, $F_A$ to $F_E$, $S_1$ to $S_4$, $n_D$ and $\nu$ all have the same meaning as given in the foregoing table and specification,

[E.F.=42.55. Magnif. factor=5.0×. N.A.=0.10]

| Lens | Radii | Thickness | Focal length | Spacing | $n_D$ | $\nu$ |
|---|---|---|---|---|---|---|
| A | $R_1 = \infty$<br>$R_2 = -10.765$ | $t_1 = 1.50$ | $F_A = 14.951$ | | 1.720 | 29.3 |
| | | | | $S_1 = 12.23$ | | |
| B | $R_3 = -7.586$<br>$R_4 = +9.290$ | $t_2 = 1.00$ | $F_B = -5.659$ | | 1.720 | 29.3 |
| | | | | $S_2 = 4.75$ | | |
| C | $R_5 = +42.073$<br>$R_6 = -8.954$ | $t_3 = 2.27$ | $F_C = 13.863$ | | 1.541 | 59.9 |
| | | | | $S_3 = 6.60$ | | |
| D | $R_7 = -190.55$<br>$R_8 = +17.378$ | $t_4 = 1.20$ | $F_D = -25.589$ | | 1.621 | 36.2 |
| | | | | $S_4 = 0.14$ | | |
| E | $R_9 = +21.677$<br>$R_{10} = -20.512$ | $t_5 = 3.30$ | $F_E = 17.523$ | | 1.620 | 60.3 | wherein E.F. designates the equivalent focus, and N.A. designates the numerical aperture of the objective.

It will be seen that there is here provided a simple yet inexpensive lens construction constituting a microscope objective having a slightly positive Petzval sum and a very flat field, and wherein the various refractive indices and Abbe numbers of the lens elements as well as the distribution of powers has been so chosen as to provide an excellent, well-corrected image of 5× magnification which is substantially free of lateral and longitudinal chromatic aberrations, all of which is in conformity with the stated objects of this invention.

Although but one specific form of this invention has been shown and described in detail, it will be appreciated that other forms are possible and changes may be made in the precise constructional data recited herein without departing from the spirit of the invention as defined in the appended claims.

We claim:

1. A low power microscope objective comprising four optically aligned lens members which are a first, third and fourth positive lens member named from the object side toward the rear, and a double concave second lens member, said fourth member being formed from a double concave front lens element in contact with a double convex rear lens element, said objective having a magnification of 5× and a numerical aperture of substantially 0.10, the numerical values of the constructional data for said objective being given in the table of mathematical statements herebelow wherein $R_1$ to $R_6$ designate the radii of successive lens surfaces, $F_A$ to $F_E$ designate the focal lengths of the successive lens elements, $t_1$ to $t_5$ designate the axial thicknesses of said elements, $S_1$ to $S_4$ represent the spaces between said elements, $n_D(A)$ to $n_D(E)$ represent the refractive index and $\nu(A)$ to $\nu(E)$ represent the Abbe number of the glass from which the lens elements are made, $.31F < F_A < .37F$
$.12F < -F_B < .14F$
$.29F < F_C < .35F$
$.53F < -F_D < .65F$
$.37F < F_E < .44F$
$R_1 > \pm 10.0F$
$.22F < R_2 < .28F$
$.74R_4 < R_3 < .90R_4$
$.19R_5 < R_6 < .24R_5$
$.033F < t_1 < .037F$
$.021F < t_2 < .026F$
$.047F < t_3 < .058F$
$.026F < t_4 < .036F$
$.070F < t_5 < .083F$
$.26F < S_1 < .31F$
$.10F < S_2 < .12F$
$.14F < S_3 < .17F$
$0 < S_4 < .0042F$
$1.710 < n_D(A) < 1.730$
$1.710 < n_D(B) < 1.730$
$1.531 < n_D(C) < 1.551$
$1.611 < n_D(D) < 1631$
$1.610 < n_D(E) < 1.630$
$28.0 < \nu(A) < 31.0$
$28.0 < \nu(B) < 31.0$
$58.0 < \nu(C) < 63.0$
$34.0 < \nu(D) < 38.0$
$58.0 < \nu(E) < 63.0$ 2. A low power microscope objective comprising four optically aligned lens members which are a first, third and fourth positive lens member named from the object side toward the rear, and a double concave second lens member, said fourth member being formed from a double concave front lens element in contact with a double convex rear lens element, said objective having a magnification of 5× and a numerical aperture of substantially 0.10, the numerical values of the constructional data for said objective being given in the table of mathematical statements herebelow wherein F represents the equivalent focus of the objective, $R_1$ to $R_6$ designate the radii of successive lens surfaces, $t_1$ to $t_5$ designate the axial thicknesses of said elements, $S_1$ to $S_4$ represent the spaces between said elements, $n_D(A)$ to $n_D(E)$ represent the refractive index and $\nu(A)$ to $\nu(E)$ represent the Abbe number of the glass, from which the lens elements are made, $R_1 > \pm 10.0F$
$.227F < -R_2 < .275F$
$.160F < -R_3 < .192F$
$.195F < R_4 < .237F$
$.895F < R_5 < 1.08F$
$.190F < -R_6 < .228F$
$4.0F < -R_7 < 4.9F$
$.367F < R_8 < .446F$
$.460F < R_9 < .550F$
$.435F < -R_{10} < .53F$
$.033F < t_1 < .037F$
$.021F < t_2 < .026F$
$.047F < t_3 < .058F$
$.026F < t_4 < .036F$
$.070F < t_5 < .083F$
$.26F < S_1 < .31F$
$.10F < S_2 < .12F$
$.14F < S_3 < .17F$
$0 < S_4 < .0042F$ 3. A low power microscope objective comprising four optically aligned lens members including a first, third and fourth positive lens member named from the object side toward the rear, said fourth member being formed from a double concave front lens element in contact with a double convex rear lens element, said objective having a magnification of 5× and a numerical aperture of substantially 0.10, the constructional data for said objective being given in the table of mathematical statements herebelow wherein $R_1$ to $R_{10}$ designate the radii of successive lens surfaces, $F_A$ to $F_E$ designate the focal lengths of the successive lens elements, $t_1$ to $t_5$ designate the axial thicknesses of said elements, $S_1$ to $S_4$ represent the spaces between said elements, $n_D(A)$ to $n_D(E)$ represent the refractive index and $\nu(A)$ to $\nu(E)$ represent the Abbe number of the glass from which the lens elements are made,

[E.F.=42.55. Magnification=5×. N.A.=0.10]

| Lens | Radii | Thickness | Focal Length | Spacing | $n_D$ | $\nu$ |
|---|---|---|---|---|---|---|
| A | $R_1 = \infty$<br>$R_2 = -10.765$ | $t_1 = 1.50$ | $F_A = 14.951$ | $S_1 = 12.32$ | 1.720 | 29.3 |
| B | $R_3 = -7.586$<br>$R_4 = +9.290$ | $t_2 = 1.00$ | $F_B = -5.659$ | $S_2 = 4.75$ | 1.720 | 29.3 |
| C | $R_5 = +42.073$<br>$R_6 = -8.954$ | $t_3 = 2.27$ | $F_C = 13.863$ | $S_3 = 6.60$ | 1.541 | 59.9 |
| D | $R_7 = -190.55$<br>$R_8 = +17.378$ | $t_4 = 1.20$ | $F_D = -25.580$ | $S_4 = 0.14$ | 1.621 | 36.2 |
| E | $R_9 = +21.677$<br>$R_{10} = -20.512$ | $t_5 = 3.30$ | $F_E = 17.523$ | | 1.620 | 60.3 | wherein E.F. designates the equivalent focus, and N.A. designates the numerical aperture of the objective.

No references cited.

UNITED STATES PATENT OFFICE
CERTIFICATE OF CORRECTION

Patent No. 3,115,538                 December 24, 1963

Paul L. Ruben et al.

It is hereby certified that error appears in the above numbered patent requiring correction and that the said Letters Patent should read as corrected below.

Column 1, line 54, for "betwen" read -- between --; column 2, line 36, for "resignate" read -- designate --; column 4, line 52, for "1631" read -- 1.631 --; column 6, in the table, under the heading "Spacing", line 1 thereof, for $S_1=12.32$    read    $S_1=12.23$ Signed and sealed this 9th day of June 1964.

(SEAL)
Attest:
ERNEST W. SWIDER

Attesting Officer

EDWARD J. BRENNER
Commissioner of Patents